United States Patent
Wataya et al.

(10) Patent No.: US 9,988,572 B2
(45) Date of Patent: Jun. 5, 2018

(54) LIGHTING APPARATUS

(71) Applicant: SHIN-ETSU CHEMICAL CO., LTD., Tokyo (JP)

(72) Inventors: Kazuhiro Wataya, Echizen (JP); Toshihiro Tsumori, Echizen (JP); Toshihiko Tsukatani, Echizen (JP); Takehisa Minowa, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days. days.

(21) Appl. No.: 15/122,043

(22) PCT Filed: Nov. 28, 2014

(86) PCT No.: PCT/JP2014/081576
§ 371 (c)(1),
(2) Date: Aug. 26, 2016

(87) PCT Pub. No.: WO2015/129116
PCT Pub. Date: Sep. 3, 2015

(65) Prior Publication Data
US 2017/0009131 A1    Jan. 12, 2017

(30) Foreign Application Priority Data
Feb. 28, 2014    (JP) ................ 2014-037808

(51) Int. Cl.
*F21V 9/16* (2006.01)
*C09K 11/02* (2006.01)
(Continued)

(52) U.S. Cl.
CPC .......... *C09K 11/025* (2013.01); *C09K 11/616* (2013.01); *C09K 11/7721* (2013.01);
(Continued)

(58) Field of Classification Search
USPC ............... 362/34, 84, 219.08, 260; 250/483; 252/301
See application file for complete search history.

(56) References Cited

U.S. PATENT DOCUMENTS

| | | |
|---|---|---|
| 3,576,756 A | 4/1971 | Russo |
| 8,267,541 B2 | 9/2012 | Watanabe et al. |

(Continued)

FOREIGN PATENT DOCUMENTS

| | | |
|---|---|---|
| JP | 2005-8844 A | 1/2005 |
| JP | 2008-135381 A | 6/2008 |

(Continued)

OTHER PUBLICATIONS

International Search Report issued in PCT/JP2014/081576, dated Jan. 20, 2015.

(Continued)

*Primary Examiner* — Matthew Mikels
(74) *Attorney, Agent, or Firm* — Birch, Stewart, Kolasch & Birch, LLP

(57) ABSTRACT

This lighting apparatus is provided with a blue LED chip having a maximum peak at a wavelength of 420-480 nm and a fluorescent material-containing resin layer disposed on the front of the blue LED chip in the light emission direction. The fluorescent material-containing resin layer is obtained by mixing and dispersing a LuAg fluorescent material, which is represented by the formula $Lu_3Al_5O_{12}:Ce^{3+}$ and in which the Ce activation rate is 2 mol. % or lower relative to Lu, and a double fluoride fluorescent material represented by the formula $A_2(B_{1-x}Mn_x)F_6$ (in the formula, A is at least one type of element selected from among the group consisting of Li, Na, K and Cs, B is at least one type of element selected from among the group consisting of Si, Ti, Nb, Ge and Sn, and x is an integer that falls within the range $0.001 \leq x \leq 0.1$) in a resin. The present invention is capable of achieving a (Continued)

higher sense of brightness, high visibility and a sense of brightness across a wide range under scotopic conditions or mesopic conditions with an emitted light color close to black body radiation.

18 Claims, 4 Drawing Sheets

(51) Int. Cl.
    *C09K 11/61* (2006.01)
    *C09K 11/77* (2006.01)
    *F21V 3/04* (2018.01)
    *F21Y 115/10* (2016.01)
    *F21W 131/10* (2006.01)
    *F21W 131/101* (2006.01)
    *F21W 131/103* (2006.01)

(52) U.S. Cl.
    CPC ........ *C09K 11/7774* (2013.01); *F21V 3/0463* (2013.01); *F21V 9/16* (2013.01); *F21W 2131/10* (2013.01); *F21W 2131/101* (2013.01); *F21W 2131/103* (2013.01); *F21Y 2115/10* (2016.08)

(56) References Cited

U.S. PATENT DOCUMENTS

2009/0072255 A1* 3/2009 Takahashi ............ C09K 11/584
                                                                     257/98
2009/0173957 A1 7/2009 Brunner et al.
2011/0248624 A1 10/2011 Kishimoto et al.
2012/0018673 A1* 1/2012 Raukas ............... C09K 11/7774
                                                            252/301.4 R
2012/0146079 A1 6/2012 Baumann et al.
2012/0261704 A1 10/2012 Meyer et al.
2013/0264937 A1* 10/2013 Sakuta .................. H01L 33/504
                                                            313/503

FOREIGN PATENT DOCUMENTS

| JP | 2009-151967 A | 7/2009 |
| JP | 2011-233511 A | 11/2011 |
| JP | 2012-9434 A | 1/2012 |
| JP | 2013-502711 A | 1/2012 |
| JP | 2012-38504 A | 2/2012 |
| JP | 2012-62444 A | 3/2012 |

OTHER PUBLICATIONS

Shirakura et al., "The Effect of Spectral Power Distribution on the Perception of Scene Brightness in Nighttime Lit Streets", Journal of the Illuminating Engineering Institute of Japan, vol. 96, No. 5, 2012, pp. 259-271.

Written Opinion of the International Searching Authority issued in PCT/JP2014/081576, dated Jan. 20, 2015.

European Patent Office Communication and extended search report issued in the corresponding European Patent Application No. 14883876.6 dated Aug. 8, 2017.

* cited by examiner

LIGHTING APPARATUS

TECHNICAL FIELD

This invention relates to a lighting apparatus suitable for an outdoor luminaire for utilizing in those areas that are dim or dark (where no light source is available nearby) at night, specifically, suitable for an outdoor luminaire installed, for example, in pathways, roadways, plazas, residential areas, and tunnels.

BACKGROUND ART

In urban cities, most areas are brightly illuminated even at night by many light sources including automobile headlights and store illuminations. On the other hand, most areas in suburbs and provincial districts are dark at night, and therefore, streetlights and other outdoor luminaire are provided in areas such as pathways, roadways, parks, and tunnels for the safety and security purposes.

However, when excessively-high-intensity luminaires are installed in suburbs and provincial districts and turned on at night to produce bright illumination, the bright illumination may interfere in normal life for residents. Besides, it consumes excessive electrical power and requires high installation costs. It would be desirable to have outdoor luminaires which can attain the purposes of safety, security and crime prevention without excessive power consumption.

Recently, the light sources for streetlights and outdoor luminaires are considered from the standpoints of maintenance and economy, and LED lamps are of greater interest in view of advantageous in power consumption and lifetime over traditional incandescent lamps and fluorescent lamps. LED lamps have a wide variation of light emission. Among them, the LED lamps using the blue LED that produce light including a blue component may be used as the light source for outdoor luminaires, typically as the blue streetlights which are nowadays introduced as them. The power utility efficiency of LED lamps is very high. The power necessary for LED lamps to provide an equivalent illuminance is as low as ⅕ or less of the power consumed by incandescent lamps. LED lamps are generally believed to have a lifetime of several tens of thousands hours, leading to savings of labor and cost for maintenance service. For these reasons, LED lamps are suited for use in streetlights and outdoor luminaires which are intended for long-term continuous operation.

White LED packages for general lighting application have the structure that a phosphor emitting green, yellow, or red fluorescence is coated on the front surface of a blue LED chip having an emission wavelength of 440 to 470 nm. With this structure, broad luminescent light having a peak wavelength around 555 nm is combined with blue light of unconverted wavelength, thereby white light is produced. White LED lamps for most luminaires utilize luminescent light having a peak wavelength of about 555 nm because human eyes have high sensitivity to light of wavelength near 555 nm. In principle, light rich in such wavelength components provides highly effective lighting. However, it is known that under scotopic vision conditions at night streets or under mesopic vision conditions immediately after sunset, the peak wavelength of human visual sensitivity shifts from 555 nm to the shorter wavelength side as shown in FIG. 7. This is known as the Purkinje effect.

Under scotopic and mesopic vision conditions, the night luminaires using white LEDs having an emission peak shifted to a wavelength shorter than 555 nm are preferred. For night luminaire, luminaires having a high color temperature are under study (Non-Patent Document 1). These prior art night-lighting luminaires are not regarded as complying with a change of visual sensitivity based on the Purkinje effect because the light does not fully contain wavelength components of the highest visual sensitivity at the scotopic and mesopic vision levels.

Photoreceptor cone cells and rod cells are distributed in the human eyeball retina, and it has been known that the cone cells are responsible for color vision in bright places while the rod cells are responsible for sensing the light in dark places. These cone cells and rod cells are not evenly distributed on the human retina, and the cone cells are densely packed in the part called "fovea centralis", and the rod cells are concentrated at the outer edges of the retina. In other words, human eyes are conceived to have a structure such that brightness is sensed by peripheral vision rather than the central vision in the environment such as scotopic and mesopic vision conditions where the rod cells are the main contributor. In view of such situation, the lighting apparatus used in such environment preferably is the one having higher light amount in the peripheral area remote from the optical axis. However, most of the LED night luminaires are brightest in the area of the optical axis with the light amount rapidly reducing toward the periphery. By the way, the LED luminaires recently used for streetlights often have high color temperature. However, these streetlights are merely designed to increase the quantity of blue light without taking into account the visual sensitivity under scotopic and mesopic vision conditions.

PRIOR ART DOCUMENTS

Patent Documents

Patent Document 1: JP-A 2008-135381
Patent Document 2: JP-A 2009-151967
Patent Document 3: JP-A 2012-038504
Patent Document 4: JP-A 2012-009434
Patent Document 5: U.S. Pat. No. 3,576,756

Non-Patent Document

Non-Patent Document 1: Shirokura and two others, "Influence on spatial brightness of spectral characteristics of streetlights", Journal of the Illuminating Engineering Institute of Japan, Vol. 96, No. 5, 259-271 (2012)

SUMMARY OF THE INVENTION

Problems to be Solved by the Invention

The present invention has been completed in view of the situation as described above, and an object of the invention is to provide a lighting apparatus which produces illumination affording brighter lighting to human eyes and brightness over a broader range under scotopic and mesopic vision conditions as often encountered in suburbs, provincial districts, rural districts, and tunnels.

Means for Solving the Problems

The inventors studied for the LED lighting that could mitigate lowering of visual perception due to the change of visual sensitivity wavelength under scotopic and mesopic vision conditions. The inventors focused on $Lu_3Al_5O_{12}$:

Ce$^{3+}$ phosphor (LuAG phosphor) as the phosphor that can be excited with blue LED and is for use with blue LED as the light source. The inventors made a study to improve the brightness perception and visual perception under scotopic and mesopic vision conditions of an LED lighting based on a combination of blue LED with LuAG phosphor as the phosphor.

In the case of the LuAG phosphor, proportion of the 5d→$^2$F$_{5/2}$ transition in relation to the 5d→$^2$F$_{7/2}$ transition can be controlled by adjusting the concentration of Ce added as an activator in the crystal, namely, the Ce activation rate relative to Lu to thereby increase light emission near 510 nm that is advantageous under the scotopic and mesopic vision conditions. Accordingly, luminaires suitable for use under scotopic and mesopic vision conditions can be realized by combining the LuAG phosphor with the blue LED.

However, color of the light emitted from such luminaires obtained by using the LuAG phosphor and the blue LED is more or less bluish or greenish because of the emission spectrum leaning to the short wavelength side of the visible light, and chromaticity measured was remote from black body radiation. While human eyes have reduced sensitivity to colors under scotopic and mesopic vision conditions, the light source with the chromaticity remote from black body radiation is uncomfortable to some people.

Deviation from the black body radiation is generally represented by Δuv, and in such a case, addition of red light is effective in reducing the Δuv and to bring the light color close to black body radiation. The addition of red light in the night luminaire using blue light for the light source can be accomplished by incorporating a red LED or the like in the lighting apparatus while such incorporation results in the defect of complicated circuit. Another method is simultaneous use of a phosphor which emits red light by excitement with the blue LED, and exemplary such phosphors emitting red light by the excitement with blue light include nitride phosphors and oxynitride phosphors such as SCASN, CASN, and α-SiAlON. These phosphors, however, have a feature of absorbing blue-green, green, and yellow lights in addition to the blue light, and use of these phosphors with the LuAG phosphor for the purpose of emitting red light invites significant decrease in the light intensity in the range of 507 nm to 555 nm which is the range effective under scotopic and mesopic vision conditions.

The inventors made an intensive study to solve the problems as described above, and found that a lighting apparatus emitting a light having a color near the black body radiation with reduced Δuv having an improved brightness perception in peripheral vision under scotopic and mesopic vision conditions is realized when a lighting apparatus prepared by combining a blue LED and an LuAG phosphor having cerium Ce activation rate reduced to 2% or less is further combined with a complex fluoride red light-emitting phosphor containing manganese for the activator and also an element selected from Si, Ti, Nb, Ge, and Sn. The inventors also found that a lighting apparatus having a markedly broader lighting area, and in particular, a broader lighting area particularly under scotopic and mesopic vision conditions is realized when these phosphors are added and dispersed in a resin to form a phosphor-containing resin layer, and this phosphor-containing resin layer is disposed in front of the blue LED in the light emission direction. The present invention is based on such findings.

Accordingly, the present invention provides the following lighting apparatus.

[1] A lighting apparatus comprising a blue LED chip having maximum peak at a wavelength of 420 to 480 nm and a phosphor-containing resin layer disposed in front of the blue LED chip in its emission direction, wherein the phosphor-containing resin layer comprises an LuAG phosphor having the following compositional formula (1):

Lu$_3$Al$_5$O$_{12}$:Ce$^{3+}$      (1)

and a Ce activation rate in relation to Lu of up to 2 mol %, and a complex fluoride phosphor having the following compositional formula (2):

A$_2$(B$_{1-x}$Mn$_x$)F$_6$      (2)

wherein A is at least one element selected from the group consisting of Li, Na, K, and Cs; B is at least one element selected from the group consisting of Si, Ti, Nb, Ge, and Sn; and x is a positive number satisfying 0.001≤x≤0.1, and the LuAG phosphor and the complex fluoride phosphor are added and dispersed in a resin.

[2] A lighting apparatus according to [1] wherein the resin is a silicone resin or an epoxy resin.

[3] A lighting apparatus according to [1] wherein the resin is at least one thermoplastic resin selected from the group consisting of polyethylene, polypropylene, polyvinyl chloride, polyethylene terephthalate, polycarbonate, polystyrene, acryl resin and ABS resin.

[4] A lighting apparatus according to any one of [1] to [3] wherein Δuv value of the emission color is in the range of −0.03 to +0.03.

Advantageous Effects of the Invention

The present invention is capable of providing a lighting apparatus emitting a light having a color near the black body radiation with improved brightness perception under scotopic and mesopic vision conditions and also with excellent visual perception and brightness perception in a wider area.

EMBODIMENT FOR CARRYING OUT THE INVENTION

Figure 1:
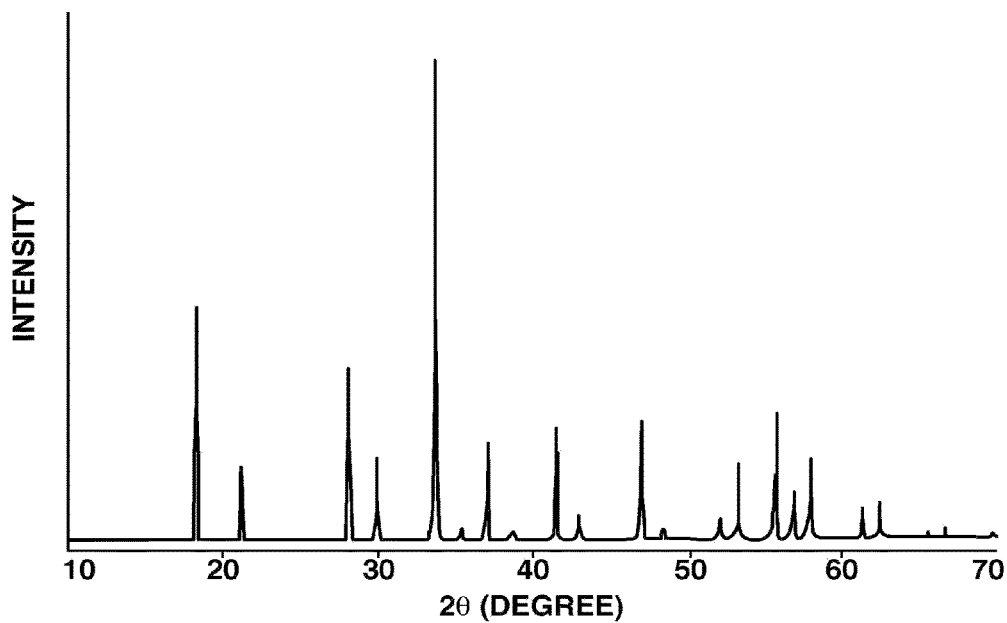
FIG. 1 is a diagram showing the XRD profile of Lu$_3$Al$_5$O$_{12}$:Ce$^{3+}$ phosphor particles obtained in Example 1.

Next, the lighting apparatus of the present invention is described in detail.

The lighting apparatus of the present invention includes a blue LED chip having a maximum peak in the wavelength range of 420 to 480 nm. The blue LED chip may be a well-known blue LED package in which a blue LED chip, wirings, and the like are sealed with an encapsulant. Any of well-known or commercially available blue LED packages may be used. Those blue LED chips having a maximum peak at a shorter or longer wavelength than the wavelength range defined above are undesirable because the excitation efficiency of the phosphors will be extremely reduced.

The lighting apparatus of the present invention also includes a phosphor-containing resin layer which is disposed in front of the blue LED chip in its emission direction. The phosphor-containing resin layer has a phosphor (LuAG phosphor) added and dispersed in a resin, the LuAg phosphor having the compositional formula (1):

$$Lu_3Al_5O_{12}:Ce^{3+} \quad (1)$$

and a Ce activation rate relative to Lu (i.e., proportion of Ce based on the sum of Lu and Ce) of up to 2 mol % and particularly up to 1 mol %, and preferably at least 0.1 mol %. Although the content of the phosphor represented by the compositional formula (1) may vary by the distance, position, strength, and the like of the phosphor-containing resin layer where the phosphor is disposed, the content is preferably at least 0.5% by weight and up to 50% by weight.

When the Ce activation rate relative to Lu exceeds 2 mol %, the proportion of 5 d→$^2F_{7/2}$ transition becomes significantly higher than the proportion of 5 d→$^2F_{5/2}$ transition. The peak position of emission spectrum then shifts toward the longer wavelength side, and the emission wavelength largely deviates from the visual sensitivity under scotopic or mesopic vision, resulting in lighting with poor brightness under scotopic or mesopic vision. When the Ce activation rate relative to Lu is less than 0.1 mol %, the phosphor itself has a poor absorptivity with the risk that light near wavelength 510 nm giving bright perception under scotopic or mesopic vision may become insufficient.

The LuAG phosphor used herein may be prepared by well-known methods. For example, lutetium oxide, cerium oxide, and aluminum oxide in powder form may be mixed in the amounts realizing the desired composition with barium fluoride added as a flux. The powder mixture may be heated at a high temperature in air, an inert atmosphere (e.g., nitrogen), or reducing atmosphere (e.g. an inert gas partly replaced by a reducing component such as hydrogen) to form a complex oxide, which is disintegrated on a ball mill or the like to an appropriate size.

The phosphor-containing resin layer used in the present invention is the one further containing a complex fluoride phosphor added and dispersed therein. The complex fluoride phosphor is represented by the following compositional formula (2):

$$A_2(B_{1-x}Mn_x)F_6 \quad (2)$$

wherein A is at least one element selected from the group consisting of Li, Na, K, and Cs; B is at least one element selected from the group consisting of Si, Ti, Nb, Ge, and Sn; x is a positive number satisfying 0.001≤x≤0.1. Although the content of the phosphor represented by the compositional formula (2) may vary by the distance, position, strength, and the like of the phosphor-containing resin layer where the phosphor is disposed, the content is preferably at least 1% by weight to up to 40% by weight of the phosphor-containing resin layer.

The complex fluoride phosphor of the present invention may be prepared by a known method (see, for example, U.S. Pat. No. 3,576,756 (Patent Document 5)).

The LuAG phosphor and the complex fluoride phosphor used herein are both in particulate form. From the aspect of emission efficiency, the phosphor particles preferably have an average particle size of 1.5 to 50 µm. If the average particle size is less than 1.5 µm, the emission efficiency of phosphor may lower, with a drop in lighting efficiency. If the average particle size exceeds 50 µm, this raises no problems with respect to lighting characteristics, but a larger amount of phosphor must be used to increase the number of particles, undesirably leading to an increased cost. The phosphor particle size used in the present invention may be determined, for example, by dispersing phosphor particles in a gas or water stream and measuring their size by the laser diffraction scattering method.

In the phosphor layer, a phosphor other than the LuAG phosphor represented by the compositional formula (1) and the complex fluoride phosphor represented by the compositional formula (2) may be used for the purposes of improving the tone and color rendering of the lighting apparatus as long as the objects of the invention are not impaired. Total content of the phosphors in the phosphor-containing resin layer of the present invention is preferably at least 1.5% by weight to up to 90% by weight.

The resin of the phosphor-containing resin layer may be a transparent or a semi-transparent resin, and exemplary such resins include silicone resins and epoxy resins. The phosphor-containing resin layer may be formed by adding and dispersing the phosphor in an uncured resin composition, applying the resin composition to the surface of a blue LED chip or a blue LED package, and curing the resin composition. Alternatively, a phosphor-containing resin layer may be obtained by curing and molding, and this phosphor-containing resin layer may be disposed in front of a blue LED chip or a blue LED package in its emission direction.

The resin of the phosphor-containing resin layer may be a thermoplastic resin selected from polyethylene, polypropylene, polyvinyl chloride, polyethylene terephthalate, polycarbonate, polystyrene, acryl resin and ABS resin, which may be used alone or in combination of two or more. When a thermoplastic resin is used, the thermoplastic resin may be kneaded with the phosphor to disperse the phosphor in the thermoplastic resin, and then molded to obtain the phosphor-containing resin layer. This phosphor-containing resin layer may be disposed in front of the blue LED chip or the blue LED package in its emission direction.

The phosphor-containing resin layer may be molded by a well-known molding method such as compression molding, extrusion molding, or injection molding. The resin may be molded to any desired shape such as a film or a thin plate and of any desired size. The shape and size of the phosphor-containing resin layer may be adequately selected depending on how the phosphor-containing resin layer is used. The phosphor-containing resin layer may typically have a thickness in a range of about 0.02 to 5 mm although the shape is not particularly limited.

The phosphor-containing resin layer may contain additives other than the resin or the phosphors to the extent not adversely affecting the object of the present invention. Suitable additives include those for improving resistance to weathering such as UV-induced degradation, those for promoting light scattering, and those for coloring, and exemplary additives include silica, alumina, mica, yttria, zinc oxide, zirconia, blue pigments, green pigments, yellow pigments, and red pigments. The content of such additive is typically up to 10% by weight and preferably at least 0.01% by weight and up to 5% by weight of the phosphor-containing resin layer.

Preferably, the lighting apparatus of the present invention takes the form of remote phosphor type in which the phosphor-containing resin layer is spaced apart from the blue LED package via a gas or vacuum layer. The lighting apparatus of the remote phosphor type has intensity distribution characteristics such as surface emission and a large radiation angle different from general LED lamps. In human eyeball, rod cells are scattered in the area remote from fovea centralis, and therefore, outdoor luminaires used for the night lighting preferably emit a light having the light component with the wavelength near 507 nm in the area remote from the optical axis of the lighting apparatus. Therefore, the lighting apparatus of the remote phosphor type having large radiation angle distribution is well suited for the outdoor lighting apparatus compared with the type wherein the phosphor is disposed on the blue chip.

The light emitted from the lighting apparatus of the present invention (irradiation beam) is a mixture of the light emitted from a blue LED, the light emitted from an LuAG phosphor, and the light emitted from a complex fluoride phosphor, and the lighting apparatus may emit a light with the color near the black body radiation when the ratio of the phosphors used is adjusted, namely, when the ratio of the LuAG phosphor represented by the compositional formula (1) which emits light by excitement with blue light and the complex fluoride phosphor represented by the compositional formula (2) which emits light by excitement with blue light is adjusted. More specifically, the ratio of the LuAG phosphor represented by the compositional formula (1) and the complex fluoride phosphor represented by the compositional formula (2) [(LuAG phosphor):(complex fluoride phosphor)] in weight ratio is preferably 1:0.1 to 1:10, and more preferably 1:0.5 to 1:4.

When the ratio S1/S2 of intensity S1 of the broad emission peak near wavelength 460 to 620 nm to intensity S2 of the emission peak of the emission line spectrum near 630 nm is at least 0.5 and up to 0.9 in the emission spectrum from the lighting apparatus of the present invention, Δuv corresponding to the deviation of the color emitted from the lighting apparatus from the black body radiation can be adjusted to −0.03 to +0.03. When such light-emission conditions are selected, the luminaire will be the one which emits a light having a color near white, and the light emitted will be prevented from giving an uncomfortable impression to human eyes. In addition, when the Δuv is adjusted to the range of −0.01 to +0.01, the luminaire will be the one having an even smaller color deviation of the emitted light from the black body radiation with the color with even more comfortable impression. When the S1/S2 is less than 0.5 or in excess of 0.9, the Δuv may become less than −0.03 or in excess of +0.03, and in such a case, the color of the light emitted may deviate from white to be a color unsuitable for a luminaire. More particularly, when the LuAG phosphor represented by the compositional formula (1) is solely used without the complex fluoride phosphor represented by the compositional formula (2), no peak in the emission line spectrum will be present near 630 nm, and the value of the Δuv will exceed 0.03, and the light emitted will be somewhat near blue or green.

The lighting apparatus of the present invention complies with the change of visual sensitivity based on Purkinje effect and sufficiently contains wavelength components of the highest visual sensitivity at the scotopic and mesopic vision levels. In addition, since the color emitted is only slightly deviated from black body radiation, the light emitted from the lighting apparatus of the present invention gives favorable impression.

The lighting apparatus (luminaire device) of the invention is a luminaire suitable for outdoor use, namely, an outdoor luminaires such as streetlight for installation in those areas with less brightness at night or where least light is available (where no light source is available nearby), for example, pathways, roadways, plazas, residential areas, and tunnels. It may also be used indoor if the indoor area is in a similar dark environment, because it is suitable for use in scotopic and mesopic vision conditions.

EXAMPLES

Next, the present invention is described in further detail by referring to the following Examples and Comparative Examples. However, the scope of the present invention is not limited to the Examples.

Example 1

Lutetium oxide ($Lu_2O_3$) powder of 99.9% purity having an average particle size of 1.0 μm, aluminum oxide ($Al_2O_3$) powder of 99.0% purity having an average particle size of 0.5 μm, and cerium oxide ($CeO_2$) powder of 99.9% purity having an average particle size of 0.2 μm were mixed in a Lu:Al:Ce ratio (molar ratio) of 2.97:5.0:0.03 to obtain 1,000 g of a powder mixture. To this powder mixture, 200 g of barium fluoride was added as a flux, and the mixture was thoroughly mixed. The mixture was filled in an alumina crucible and heat treated in argon gas at 1,400° C. for 10 hours. The fired product was disintegrated on a ball mill, washed with about 0.5 mol/L hydrochloric acid and then with deionized water. Subsequent solid/liquid separation and drying yielded $Lu_3Al_5O_{22}:Ce^{3+}$ phosphor particles (Ce activation rate in relation to Lu; 1 mol %) having an average particle size of 20 μm.

The result of XRD analysis of the phosphor particles is shown in FIG. 1. The diffraction pattern of main phase of the phosphor particles was coincident with the diffraction peaks of lutetium aluminum garnet phase, demonstrating that $Lu_3Al_5O_{12}:Ce^{3+}$ containing garnet phase as its main phase was obtained.

In addition, $K_2(Si_{0.97}Mn_{0.03})F_6$ phosphor particles having an average particle size of 21 μm were obtained according to the procedure described in U.S. Pat. No. 3,576,756 (Patent Document 5). When emission spectrum of the phosphor particles by excitement using blue light having the wavelength of 450 nm was measured, presence of multiple emission peaks centering around 630 nm was confirmed.

The $Lu_3Al_5O_{12}:Ce^{3+}$ phosphor particles and the $K_2(Si_{0.97}, Mn_{0.03})F_6$ phosphor particles at a total amount of 30% by weight [the ($Lu_3Al_5O_{12}:Ce^{3+}$ phosphor):($K_2(Si_{0.97}, Mn_{0.03})F_6$ phosphor) weight ratio being 2:1] were dispersed in a transparent epoxy resin (SpeciFix-40 kit manufactured by Marumoto Struers K.K.) to form a slurry. The slurry was added dropwise to the emissive surface of a blue LED package (NS6b083T manufactured by Nichia Corp.) and cured at 50° C. for 3 hours to obtain an LED package having a phosphor-containing resin layer having phosphor particles added and dispersed in the epoxy resin.

Figure 2A:
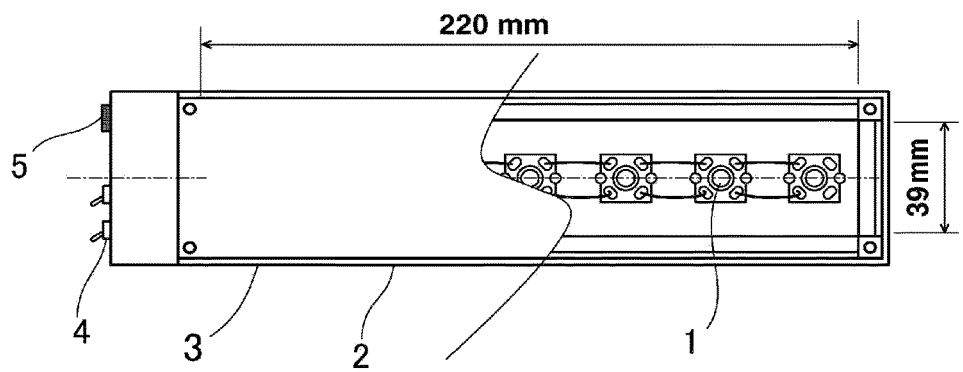
FIG. 2 shows LED luminaire manufactured in Examples and Comparative Examples. FIG. (A) is a partly cut-away plan view and FIG. (B) is a perspective view.
Figure 2B:
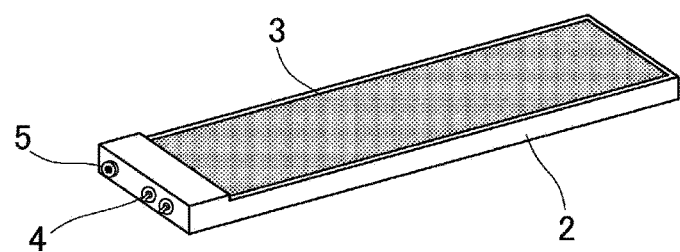

Seven LED packages thus manufactured were placed in a rectangular aluminum chassis having an inner size of 39 mm wide, 220 mm long, and 5 mm high and connected in series. A transparent matt acrylic plate of 2 mm thick was then mounted as a protective cover at a position 25 mm from the emissive surface of the LED packages to fabricate an LED luminaire (lighting apparatus) as shown in FIG. 2. In FIG. 2, 1 is the LED package, 2 is an aluminum chassis, 3 is a protective cover, 4 is a power supply terminal, and 5 is a power switch.

Figure 3:
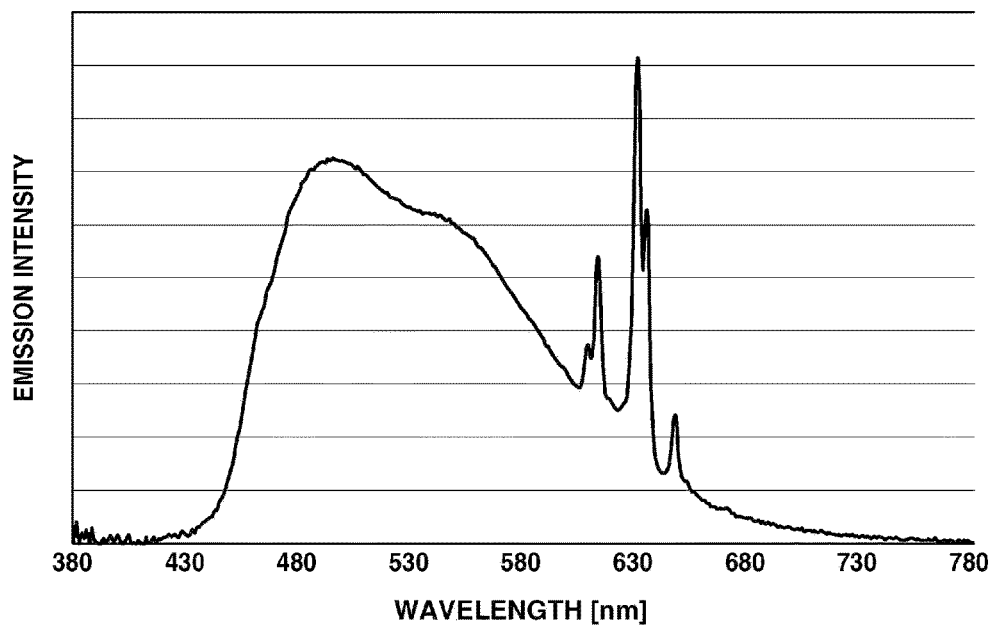
FIG. 3 is a diagram showing the spectral profile of the emission from an LED luminaire of Example 1.

Spectrum of the light from the LED luminaire was measured by a spectrophotometer CL-500 (Konica Minolta, Inc.; this spectrophotometer was also used in other Examples). The result is shown in FIG. 3. The spectrum had S1/S2 of 0.79. The Δuv of this LED luminaire measured by a total luminous flux measurement system (total luminous flux measurement (φ500) system, model HalfMoon manufactured by Otsuka Electronics Co., Ltd.; this system was also used in other Examples) was +0.022.

Example 2

Seven blue LED packages (XLamp LX-E Royal Blue manufactured by Cree Inc.) were placed in an aluminum chassis and connected in series as in Example 1. The $Lu_3Al_5O_{12}:Ce^{3+}$ phosphor particles and $K_2(Si_{0.97}, Mn_{0.03})F_6$ phosphor particles in Example 1 were kneaded in polycarbonate respectively in the phosphor concentrations of 1.8% by weight and 7.2% by weight, and the resulting polycarbonate compound was molded to prepare a polycarbonate plate of 2 mm thick. This polycarbonate plate was mounted as the phosphor-containing resin layer at a position 25 mm from the light emitting surface to produce an LED luminaire of remote phosphor type as shown in FIG. 2. In this embodiment, 3 in FIG. 2 is the phosphor-containing resin layer having a function as the protective cover.

Figure 4:
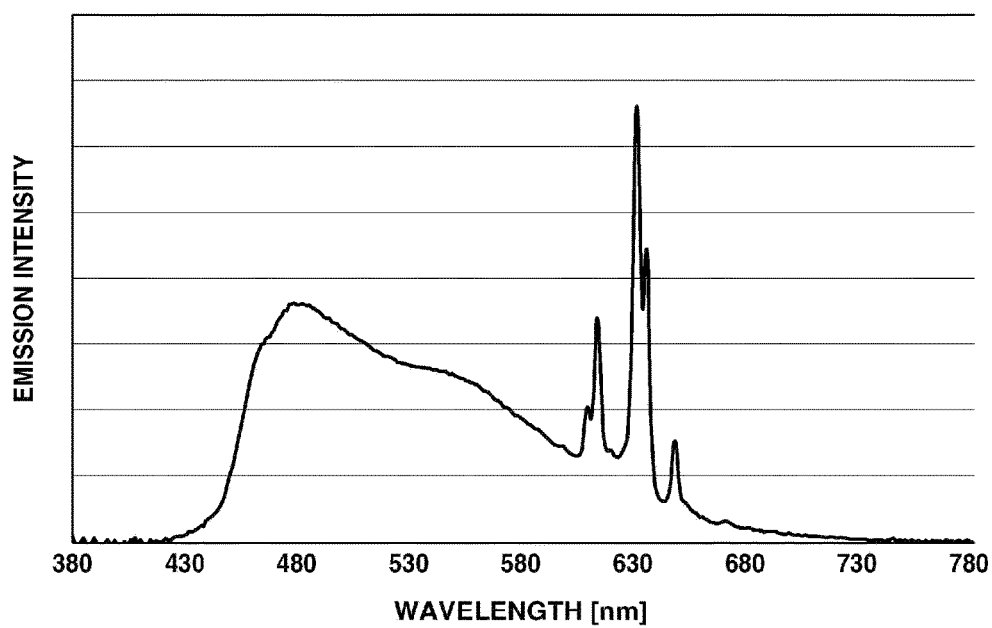
FIG. 4 is a diagram showing the spectral profile of the emission from an LED luminaire of Example 2.

Spectrum of the light from the LED luminaire was measured by a spectrophotometer. The result is shown in FIG. 4. The spectrum had S1/S2 of 0.55. The Δuv of this LED luminaire measured by a total luminous flux measurement system was −0.018.

Comparative Example 1

The procedure of Example 1 was repeated except that the phosphor particles used were solely $Lu_3Al_5O_{12}:Ce^{3+}$ phosphor particles to prepare an LED package having the phosphor-containing resin layer. An LED luminaire was produced by using the thus obtained LED package.

Figure 5:
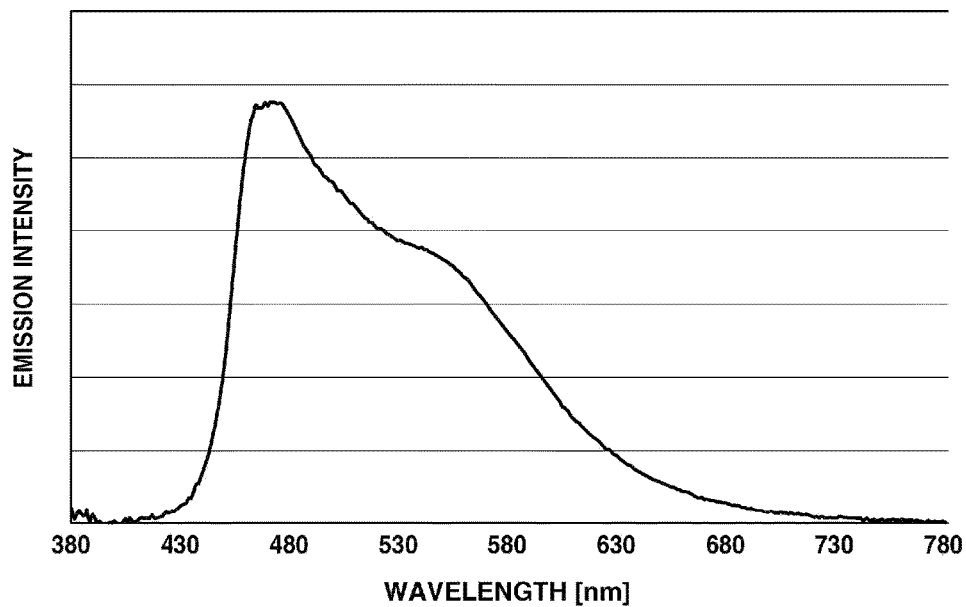
FIG. 5 is a diagram showing the spectral profile of the emission from an LED luminaire of Comparative Example 1.
Figure 6:
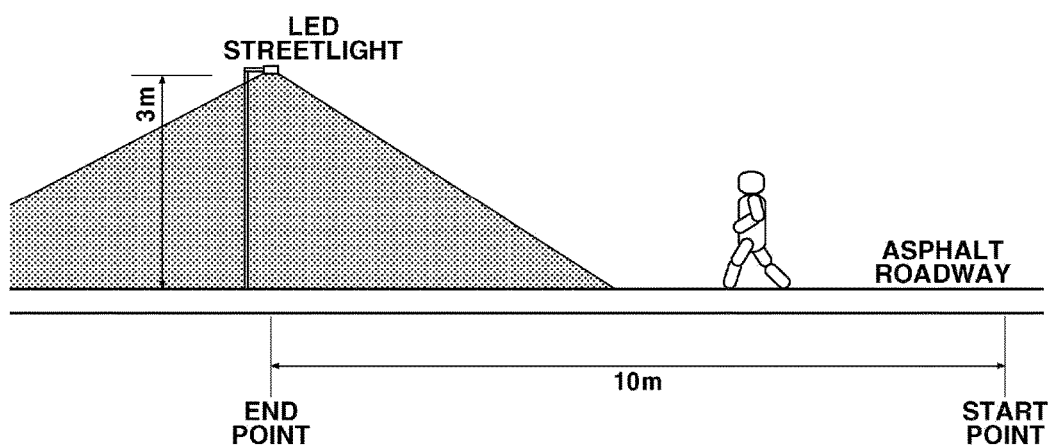
FIG. 6 is a diagram for explaining the method used in evaluating visual perception of the roadway surface and its environs using the LED luminaire of Examples and Comparative Example.
Figure 7:
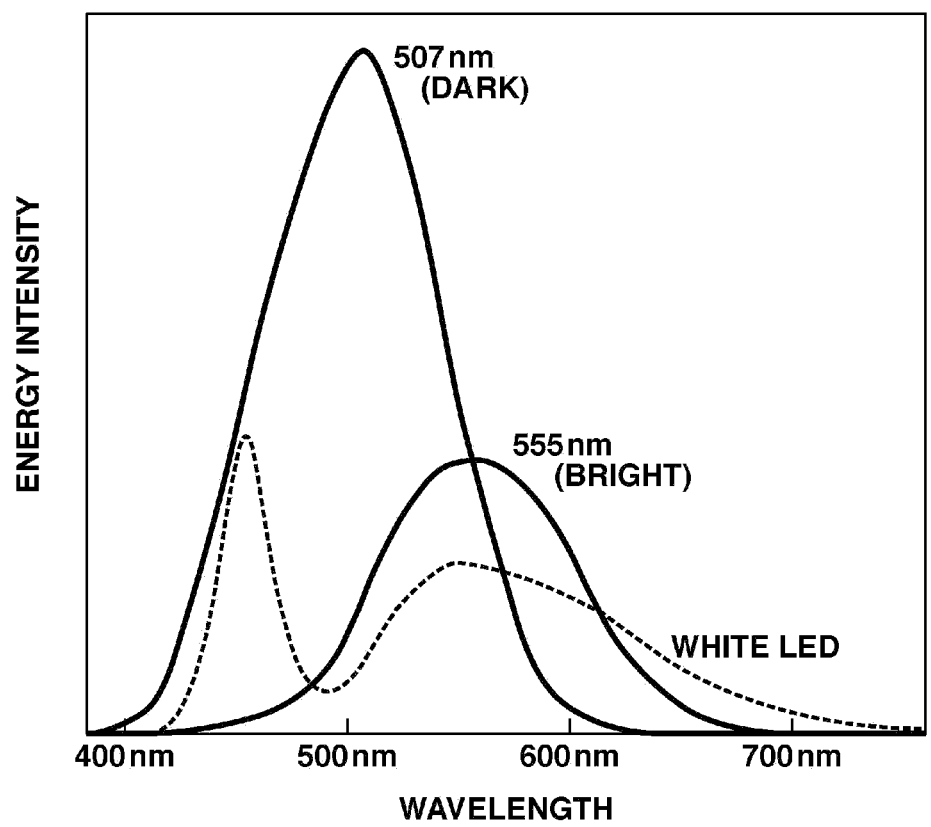
FIG. 7 is a diagram showing the emission spectrum (broken line) of a general white LED, and the peak wavelength (555 nm) in bright place and the peak wavelength (507 nm) in dark place of human eye sensitivity.

The spectrum of illuminating light of the LED luminaire was measured by the spectrophotometer, with the results shown in FIG. 5. In the spectrum, S2 peak near wavelength 630 nm was not measured. The Δuv of this LED luminaire measured by a total luminous flux measurement system was +0.034.

The LED luminaires of Examples 1 to 2 and Comparative Example 1 were respectively secured to temporary posts at a position 3 m from the asphalt road surface to prepare LED streetlights, and the LED luminaires were turned on at night by applying a voltage of 24 V. Visual perception of road surface and adjacent objects while walking from the start point (10 m from the point just under the LED luminaire) to the end point (the point just under the LED luminaire) was evaluated by a panel of 30 people. The results are shown in Table 1. The numbers in Table 1 are proportion of the people who affirmed the items in the Table, and numbers in the bracket are the number of people who affirmed the items in the Table.

TABLE 1

| Item | Example 1 | Example 2 | Comparative Example 1 |
|---|---|---|---|
| Brightness of the space | 73% (22) | 87% (26) | 73% (22) |
| Less shadow | 60% (18) | 80% (24) | 37% (11) |
| Clear view of the central area | 33% (10) | 50% (15) | 33% (10) |
| Clear view of the surrounding area | 77% (23) | 87% (26) | 77% (23) |
| Easy color distinction | 100% (30) | 100% (30) | 17% (5) |
| Non-glare light source | 23% (7) | 90% (27) | 23% (7) |
| Visibility of white line on the road surface | 100% (30) | 100% (30) | 50% (15) |
| Naturalness of the luminaire light | 93% (28) | 100% (30) | 10% (3) |

These results reveal that the LED luminaires of Examples 1 and 2 are equal to or better than the LED luminaire of Comparative Example 1 in every items of the evaluation, and in particular, the LED luminaires of Examples are excellent in color distinction and naturalness of the illumination light. These LED luminaires were also excellent in the brightness of the surrounding areas demonstrating excellence under scotopic and mesopic vision conditions.

It was revealed that the LED luminaire of Example 1 is an excellent luminaire in that it produces effective lighting providing improved visual perception over a broader space including brightness of the overall space and brightness in the surrounding region; and the LED luminaire has an advantage for an outdoor luminaire. This LED luminaire also received high marks of satisfaction in the color recognition of the surrounding scenery and naturalness of the illumination color. The LED luminaire of remote phosphor type in Example 2, in addition to them, further provides surface emission, and due to an accordingly wide spread of illumination, non-glare lighting with less shadows was available. Since the present invention produces lighting apparatus complying with the change of visual sensitivity based on the Purkinje effect under scotopic and mesopic vision conditions, it is best suited for outdoor luminaire.

REFERENCE SIGNS LIST

1 LED package
2 Aluminum chassis
3 Protective cover or phosphor-containing resin layer
4 Power supply terminal
5 Switch

The invention claimed is:
1. A lighting apparatus comprising a blue LED chip having maximum peak at a wavelength of 420 to 480 nm and a phosphor-containing resin layer disposed in front of the blue LED chip in its emission direction, wherein
the phosphor-containing resin layer comprises an LuAG phosphor having the following compositional formula (1):

$$Lu_3Al_5O_{12}:Ce^{3+} \qquad (1)$$

and a Ce activation rate in relation to Lu of up to 2 mol %, and a complex fluoride phosphor having the following compositional formula (2):

$$A_2(B_{1-x}Mn_x)F_6 \qquad (2)$$

wherein A is at least one element selected from the group consisting of Li, Na, K, and Cs; B is at least one element selected from the group consisting of Si, Ti, Nb, Ge, and Sn; and x is a positive number satisfying $0.001 \leq x \leq 0.1$, and the LuAG phosphor and the complex fluoride phosphor are added and dispersed in a resin, wherein the lighting apparatus is a remote phosphor type in which the phosphor-containing resin layer is spaced apart from the blue LED package via a gas or vacuum layer and emits light having an emission spectrum, and a ratio S1/S2 of intensity S1 of a broad emission peak near wavelength 460 to 620 nm to intensity S2 of an emission peak of an emission line spectrum near 630 nm is at least 0.5 and up to 0.9 in the emission spectrum.

2. The lighting apparatus of claim 1 wherein the resin is a silicone resin or an epoxy resin.

3. The lighting apparatus of claim 1 wherein the resin is at least one thermoplastic resin selected from the group consisting of polyethylene, polypropylene, polyvinyl chloride, polyethylene terephthalate, polycarbonate, polystyrene, acryl resin and ABS resin.

4. The lighting apparatus of claim 1 wherein Δuv value of the emission color is in the range of −0.03 to +0.03.

5. The lighting apparatus of claim 1 wherein in the phosphor-containing resin layer, a weight ratio of the LuAG phosphor and the complex fluoride phosphor (LuAG phosphor)/(complex fluoride phosphor) is in a range of 1/0.1 to 1/10.

6. The lighting apparatus of claim 1 wherein the phosphor-containing resin layer comprises the LuAG phosphor in a range of at least 0.5% by weight and up to 50% by weight of the phosphor-containing resin layer and the complex fluoride phosphor in a range of at least 1% by weight and up to 40% by weight of the phosphor-containing resin layer.

7. A lighting apparatus comprising a blue LED chip having maximum peak at a wavelength of 420 to 480 nm and a phosphor-containing resin layer disposed in front of the blue LED chip in its emission direction, wherein the phosphor-containing resin layer comprises an LuAG phosphor having the following compositional formula (1):

$$Lu_3Al_5O_{12}:Ce^{3+} \qquad (1)$$

and a Ce activation rate in relation to Lu of up to 2 mol %, and a complex fluoride phosphor having the following compositional formula (2):

$$A_2(B_{1-x}Mn_x)F_6 \qquad (2)$$

wherein A is at least one element selected from the group consisting of Li, Na, K, and Cs; B is at least one element selected from the group consisting of Si, Ti, Nb, Ge, and Sn; and x is a positive number satisfying 0.001≤x≤0.1, and the LuAG phosphor and the complex fluoride phosphor are added and dispersed in a resin, wherein the lighting apparatus is a remote phosphor type in which the phosphor-containing resin layer is spaced apart from the blue LED package via a gas or vacuum layer, and in the phosphor-containing resin layer, a weight ratio of the LuAG phosphor and the complex fluoride phosphor (LuAG phosphor)/(complex fluoride phosphor) is in a range of 1/0.1 to 1/10.

8. The lighting apparatus of claim 7 wherein the resin is a silicone resin or an epoxy resin.

9. The lighting apparatus of claim 7 wherein the resin is at least one thermoplastic resin selected from the group consisting of polyethylene, polypropylene, polyvinyl chloride, polyethylene terephthalate, polycarbonate, polystyrene, acryl resin and ABS resin.

10. The lighting apparatus of claim 7 wherein Δuv value of the emission color is in the range of −0.03 to +0.03.

11. The lighting apparatus of claim 7 wherein the phosphor-containing resin layer comprises the LuAG phosphor in a range of at least 0.5% by weight and up to 50% by weight of the phosphor-containing resin layer and the complex fluoride phosphor in a range of at least 1% by weight and up to 40% by weight of the phosphor-containing resin layer.

12. A lighting apparatus comprising a blue LED chip having maximum peak at a wavelength of 420 to 480 nm and a phosphor-containing resin layer disposed in front of the blue LED chip in its emission direction, wherein the phosphor-containing resin layer consists of an LuAG phosphor having the following compositional formula (1):

$$Lu_3Al_5O_{12}:Ce^{3+} \qquad (1)$$

and a Ce activation rate in relation to Lu of up to 2 mol %, a complex fluoride phosphor having the following compositional formula (2):

$$A_2(B_{1-x}Mn_x)F_6 \qquad (2)$$

wherein A is at least one element selected from the group consisting of Li, Na, K, and Cs; B is at least one element selected from the group consisting of Si, Ti, Nb, Ge, and Sn; and x is a positive number satisfying 0.001≤x≤0.1, and a resin, or the LuAG phosphor, the complex fluoride phosphor, a resin and an additive selected from the group consisting of silica, alumina, mica, yttria, zinc oxide, zirconia, blue pigments, green pigments, yellow pigments, and red pigments, and the LuAG phosphor and the complex fluoride phosphor are added and dispersed in the resin, and wherein the lighting apparatus is a remote phosphor type in which the phosphor-containing resin layer is spaced apart from the blue LED package via a gas or vacuum layer.

13. The lighting apparatus of claim 12 wherein the resin is a silicone resin or an epoxy resin.

14. The lighting apparatus of claim 12 wherein the resin is at least one thermoplastic resin selected from the group consisting of polyethylene, polypropylene, polyvinyl chloride, polyethylene terephthalate, polycarbonate, polystyrene, acryl resin and ABS resin.

15. The lighting apparatus of claim 12 wherein Δuv value of the emission color is in the range of −0.03 to +0.03.

16. The lighting apparatus of claim 12 wherein the lighting apparatus emits light having an emission spectrum, and a ratio S1/S2 of intensity S1 of a broad emission peak near wavelength 460 to 620 nm to intensity S2 of an emission peak of an emission line spectrum near 630 nm is at least 0.5 and up to 0.9 in the emission spectrum.

17. The lighting apparatus of claim 12 wherein in the phosphor-containing resin layer, a weight ratio of the LuAG phosphor and the complex fluoride phosphor (LuAG phosphor)/(complex fluoride phosphor) is in a range of 1/0.1 to 1/10.

18. The lighting apparatus of claim 12 wherein the phosphor-containing resin layer comprises the LuAG phosphor in a range of at least 0.5% by weight and up to 50% by weight of the phosphor-containing resin layer and the complex fluoride phosphor in a range of at least 1% by weight and up to 40% by weight of the phosphor-containing resin layer.

* * * * *